(12) United States Patent
Kaneko et al.

(10) Patent No.: US 6,822,732 B2
(45) Date of Patent: Nov. 23, 2004

(54) SURVEYING INSTRUMENT HAVING AN AUTO-COLLIMATING FUNCTION AND A DISTANCE MEASURING FUNCTION

(75) Inventors: Kenji Kaneko, Tokyo (JP); Shinichi Suzuki, Saitama (JP)

(73) Assignee: ENTAX Precision Co., Ltd., Tokyo (JP)

(*) Notice: Subject to any disclaimer, the term of this patent is extended or adjusted under 35 U.S.C. 154(b) by 0 days.

(21) Appl. No.: 10/703,440

(22) Filed: Nov. 10, 2003

(65) Prior Publication Data

US 2004/0090612 A1 May 13, 2004

(30) Foreign Application Priority Data

Nov. 11, 2002 (JP) ........................................ 2002-327068

(51) Int. Cl.[7] ................................................ G01C 3/08
(52) U.S. Cl. ........................ 356/4.05; 356/5.1; 356/5.13
(58) Field of Search ............................. 356/4.01–5.15; 250/206.1–2, 354.1

(56) References Cited

U.S. PATENT DOCUMENTS

| | | | | |
|---|---|---|---|---|
| 3,874,087 A | * | 4/1975 | Nunlist | ...................... 33/275 R |
| 4,343,550 A | * | 8/1982 | Buckley et al. | ............. 356/4.01 |
| 6,137,569 A | * | 10/2000 | Sasaki et al. | ................ 356/153 |
| 6,532,059 B2 | | 3/2003 | Shirai et al. | |
| 6,556,283 B2 | | 4/2003 | Shirai et al. | |
| 6,563,574 B2 | * | 5/2003 | Ohtomo et al. | ........... 356/141.1 |

* cited by examiner

Primary Examiner—Bernarr E. Gregory
Assistant Examiner—Brian Andrea
(74) Attorney, Agent, or Firm—Greenblum & Bernstein, P.L.C.

(57) ABSTRACT

A surveying instrument includes a surveying instrument body which is rotatable about vertical and horizontal axes and has a telescope optical system for collimating the surveying instrument relative to a survey point; a collimator optical system for projecting first light rays toward the survey point and for receiving the first light rays reflected at the survey point; an auto-collimating system which rotates the surveying instrument body to position the survey point on an optical axis of the telescope optical system; a distance measuring optical system for projecting second light rays toward the survey point and for receiving the second light rays reflected at the survey point; and a distance measuring device for calculating a distance from the surveying instrument to the survey point. The optical axes of the collimator optical system and the distance measuring optical system are offset from each other.

9 Claims, 1 Drawing Sheet

SURVEYING INSTRUMENT HAVING AN AUTO-COLLIMATING FUNCTION AND A DISTANCE MEASURING FUNCTION

BACKGROUND OF THE INVENTION

1. Field of the Invention

The present invention relates to a surveying instrument having an auto-collimating function and a distance measuring function.

2. Description of the Related Art

Conventional high-end surveying instruments such as total stations have an auto-collimating function for automatically collimating the surveying instrument relative to a survey point (corner cube) in addition to an essential function of measuring the distance from the surveying instrument to the survey point and also horizontal and vertical angles. According to the auto-collimating function, auto-collimation light rays are projected toward the survey point (corner cube) through a telescope optical system of the surveying instrument, and are subsequently reflected back toward the surveying instrument from the survey point to be received by the surveying instrument to collimate the surveying instrument relative to the survey point.

On the other hand, according to the distance measuring function such as a distance measuring function of an EDM (electronic distance meter), distance measurement light rays are projected toward a survey point through the same telescope optical system, and subsequently reflected back toward the surveying instrument from the survey point to be received by the surveying instrument to measure the distance from the surveying instrument to the survey point.

Conventionally, the auto-collimation light rays and the distance measurement light rays are projected toward a survey point to travel on an optical axis of the telescope optical system. To project the auto-collimation light rays and the distance measurement light rays to a survey point while traveling on the same optical axis, the two different aforementioned light rays that are emitted from different directions must be combined with a beam splitter (half mirror). This beam splitter inevitably causes a substantial loss in the amount of light of each of the two different light rays; the amount of light of each of the two different light rays becomes less than half. This makes it more difficult to perform an auto-collimating operation and a distance measuring operation as the distance from the surveying instrument to the survey point increases, and also becomes a cause of deterioration in accuracy of distance measurement. This problem can be overcome if different wavelengths are given to the two different light rays when a wavelength-selective beam splitter is used. However, producing two different light rays which have different wavelengths is generally costly.

SUMMARY OF THE INVENTION

The present invention provides a surveying instrument having an auto-collimating function and a distance measuring function, wherein the auto-collimation light rays and the distance measurement light rays are projected toward a survey point through the same telescope optical system, and wherein loss in the amount of light of the two different light rays are reduced.

The present invention has been devised in view of the idea that the problem of loss in the amount of light of the two different light rays can be overcome if the auto-collimation light rays and the distance measurement light rays are projected toward a survey point on different light paths, respectively, which are offset from each other; this offset does not exerts any adverse effect on either auto-collimating operation or distance measuring operation.

According to an aspect of the present invention, a surveying instrument is provided, including a surveying instrument body which is rotatable about each of a vertical axis and a horizontal axis, the surveying instrument body including a telescope optical system for collimating the surveying instrument relative to a survey point; a collimator optical system, provided in the surveying instrument body, for projecting first light rays toward the survey point through the telescope optical system and for receiving the first light rays reflected at the survey point; an auto-collimating system which rotates the surveying instrument body about each of the vertical axis and the horizontal axis to position the survey point on an optical axis of the telescope optical system in accordance with information on a location of the survey point; a distance measuring optical system, provided in the surveying instrument body, for projecting second light rays toward the survey point through the telescope optical system and for receiving the second light rays reflected at the survey point; and a distance measuring device for calculating a distance from the surveying instrument to the survey point in accordance with information on the second light rays which are projected toward the survey point by the distance measuring optical system and reflected at the survey point. An optical axis of the collimator optical system on which the first light rays travel toward the survey point and an optical axis of the distance measuring optical system on which the second light rays travel toward the survey point are offset from each other in the telescope optical system.

It is desirable for one of the optical axis of the collimator optical system and the optical axis of the distance measuring optical system to be coincident with the optical axis of the telescope optical system.

It is desirable for the optical axis of the distance measuring optical system to be coincident with the optical axis of the telescope optical system.

The collimator optical system can include a first light source which emits the first light rays; and an off-axis mirror which is provided at a position offset from the optical axis of the telescope optical system. The distance measuring optical system can include a second light source which emits the second light rays; and an on-axis mirror which is positioned on the optical axis of the telescope optical system. The off-axis mirror is angled at approximately 90 degrees with respect to the on-axis mirror, and the on-axis mirror is angled at approximately 45 degrees with respect to the optical axis of the telescope optical system.

It is desirable for the distance measuring optical system to include a light receiving element; and a second on-axis mirror which is positioned behind the on-axis mirror to be substantially parallel to the on-axis mirror so that the second light rays which are reflected at the survey point back to the telescope optical system are reflected by the second on-axis mirror to be incident on the light receiving element.

It is desirable for the telescope optical system to include a half mirror positioned behind the second on-axis mirror on the optical axis of the telescope optical system in association with the second on-axis mirror.

It is desirable for the off-axis mirror, the on-axis mirror and the second on-axis mirror to be formed as a single member positioned behind an objective lens of the telescope optical system.

It is desirable for the single member is positioned in front of a beam splitter of the telescope optical system.

In another embodiment, a surveying instrument is provided, including a surveying instrument body rotatable about each of a vertical axis and a horizontal axis; a telescope optical system, provided in the surveying instrument body, for collimating the surveying instrument relative to a survey point; a collimator optical system, provided in the surveying instrument body, for projecting first light rays toward the survey point through the telescope optical system and for receiving the first light rays reflected at the survey point; and a distance measuring optical system, provided in the surveying instrument body, for projecting second light rays toward the survey point through the telescope optical system and for receiving the second light rays reflected at the survey point. An optical path of the first light rays projected toward the survey point through the telescope optical system and an optical path of the second light rays projected toward the survey point through the telescope optical system are offset from each other in the telescope optical system.

The present disclosure relates to subject matter contained in Japanese Patent Application No. 2002-327068 (filed on Nov. 11, 2002) which is expressly incorporated herein by reference in its entirety.

BRIEF DESCRIPTION OF THE DRAWINGS

The present invention will be described below in detail with reference to the accompanying drawing in which.

DESCRIPTION OF THE PREFERRED EMBODIMENT

Figure 1:
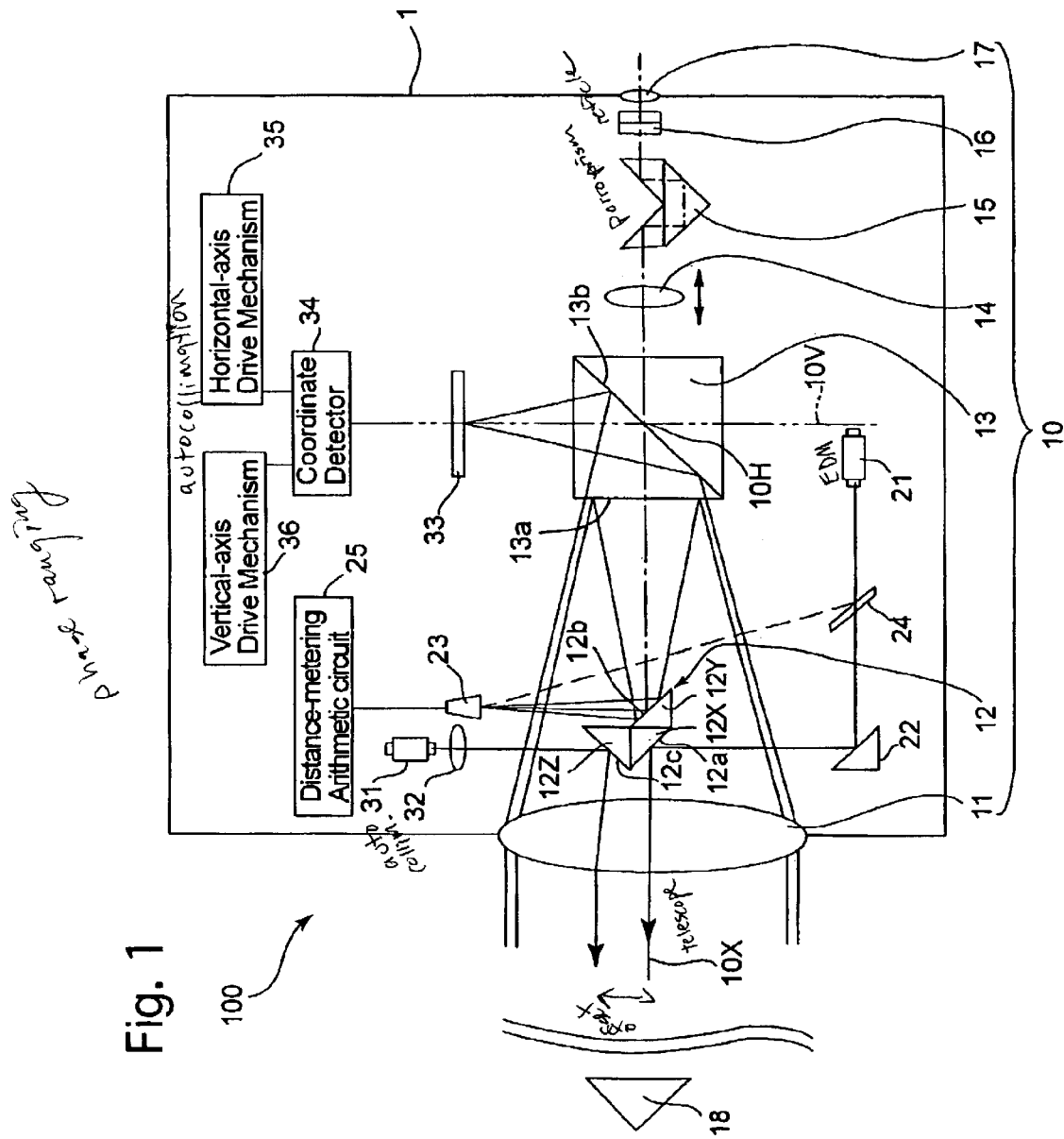
FIG. 1 is a schematic side elevational view of an embodiment of a surveying instrument according to the present invention.

As shown in FIG. 1, a present embodiment of a surveying instrument 100 is provided in a surveying instrument body 1 thereof with a telescope optical system 10 consisting an objective lens 11, a multi-functional composite mirror 12, a beam splitter (beam splitting prism) 13, a focusing lens 14, a Porro prism (erecting system) 15, a reticle 16 and an eyepiece 17, in that order from the object side (the left side as viewed in FIG. 1). The surveying instrument body 1 can rotate forward and reverse about a vertical axis 10V, and can rotate forward and reverse about a horizontal axis 10H which intersects with the vertical axis 10V, so that a surveyor can sight an image of a corner cube (reflector) 18 with the telescope optical system 10 through the eyepiece 17 by rotating the surveying instrument body 1 about the vertical axis 10V and the horizontal axis 10H as appropriate.

The multi-functional composite mirror 12 includes three right-angle mirror bodies: a first right-angle mirror body 12X, a second right-angle mirror body 12Y and a third right-angle mirror body 12Z which are cemented to form a single-piece construction of the multi-functional composite mirror 12. The first right-angle mirror body 12X is provided with a first reflecting surface 12a which is positioned on an optical axis 10X of the telescope optical system 10 to be angled at approximately 45 degrees with respect to the optical axis 10X. Likewise, the second right-angle mirror body 12Y is provided with a second reflecting surface 12b which is positioned on the optical axis 10X of the telescope optical system 10 to be angled at approximately 45 degrees with respect to the optical axis 10X and to be substantially parallel to the first reflecting surface 12a. The second right-angle mirror body 12Y is cemented to that surface of the first right-angle mirror body 12X which faces the beam splitter 13. The third right-angle mirror body 12Z is provided with a third reflecting surface 12c which is disposed at a position offset from the optical axis 10X to be angled at approximately 90 degrees with respect to the first reflecting surface 12a. The third right-angle mirror body 12Z is cemented to a top surface of first right-angle mirror body 12X.

The first right-angle mirror body 12X of the multi-functional composite mirror 12 serves as an optical element of a distance measuring optical system of an EDM for projecting distance measurement light rays toward the corner cube 18; the distance measurement light rays constitutes a radiant modulated laser beam having a wavelength of, e.g., 780 nanometers. The surveying instrument 100 is provided with a light source 21 for distance measurement and a reflecting mirror 22 in association with the first reflecting surface 12a. The distance measurement light rays which are emitted from the light source 21 are reflected by the reflecting mirror 22 to be incident on the first reflecting surface 12a in a direction substantially orthogonal to the optical axis 10X. On the other hand, the surveying instrument 100 is provided between the light source 21 and the reflecting mirror 22 with a movable reflector 24 which is moved between a retracted position, in which the movable reflector 24 is positioned outside a light path between the light source 21 and the reflecting mirror 22 so that the distance measurement light rays which are emitted from the light source 21 are incident on the reflecting mirror 22, not on the movable reflector 24, to be projected toward the corner cube 18, and a reflecting position, in which the movable reflector 24 is positioned between the light source 21 and the reflecting mirror 22 as shown in FIG. 1 so that the distance measurement light rays which are emitted from the light source 21 are reflected by the movable reflector 24 to be incident directly on a light receiving element 23 for distance measurement. The movable reflector 24 is driven to move alternately between the retracted position and the reflecting position. In addition to the first right-angle mirror body 12X which includes the first reflecting surface 12a, the light source 21, the reflecting mirror 22, the light receiving element 23 and the movable reflector 24 are elements of the distance measuring optical system provided in the surveying instrument body 1.

Accordingly, in a state where the movable reflector 24 is in the retracted position, the distance measurement light rays which are emitted from the light source 21 are projected toward the corner cube 18 to travel on the optical axis 10X of the telescope optical system 10 via the reflecting mirror 22, the first reflecting surface 12a and the objective lens 11 to be incident on the corner cube 18. Subsequently, the light rays which are incident on the corner cube 18 and reflected thereby back toward the surveying instrument 100 to be incident on the object lens 10 passes through the object lens 11 to be incident on a half mirror surface 13a of the beam splitter 13. The half mirror surface 13a allows a part of the returned distance measurement light rays (having a wavelength of 780 nanometers) to pass therethrough, and at the same time reflects the remaining part of the returned distance measurement light rays toward the second reflecting surface 12b. Since the distance measurement light rays which are emitted from the light source 21 are reflected by the first reflecting surface 12a, which is positioned on the optical axis 10X of the telescope optical system 10, to be projected toward the corner cube 18 to travel on the optical axis 10X, it can be understood that an optical axis of the distance measuring optical system of the surveying instrument 100 on which the distance measurement light rays travel toward the corner cube 18 is coincident with the optical axis 10X of the telescope optical system 10.

The distance measurement light rays which are reflected by the half mirror surface 13a are reflected by the second reflecting surface 12b to be incident on the light receiving element 23 for distance measurement. In contrast, in a state where the movable reflector 24 is in the reflecting position as shown in FIG. 1, the light rays emitted from the light source 21 are reflected by the movable reflector 24 to be incident directly on the light receiving element 23. Accordingly, the distance measurement light rays (externally-projecting modulated light rays) which are emitted from the light source 21 to be reflected by the corner cube 18 back to the telescope optical system 10 and the distance measurement light rays (internal modulated light rays) which are emitted from the light source 21 to be reflected by the movable reflector 24 are alternately incident on the light receiving element 23. The surveying instrument is provided with a distance-measuring arithmetic circuit (distance measuring device) 25 which is electrically connected to the light receiving element 23. The distance-measuring arithmetic circuit 25 calculates the distance from the surveying instrument 100 to the corner cube 18 from the phase difference between the aforementioned externally-projecting modulated light rays and the aforementioned internal modulated light rays. This principle of EDM is known in the art.

The third right-angle mirror body 12Z of the multi-functional composite mirror 12 serves as a fundamental optical element of a collimator optical system, provided in the surveying instrument body 1, for projecting auto-collimation light rays toward the corner cube 18; the auto-collimation light rays constitutes a radiant modulated laser beam having the same wavelength as that of the internal modulated laser beam for distance measurement, e.g., 780 nanometers. The surveying instrument 100 is provided with a light source 31 for auto-collimation and a projector lens 32 in association with the third reflecting surface 12c. In addition to the third right-angle mirror body 12Z (which includes the third reflecting surface 12c), the light source 31 and the projector lens 32 are also optical elements of the collimator optical system provided in the surveying instrument body 1. The auto-collimation light rays which are emitted from the light source 31 are incident on the third reflecting surface 12c, which is offset from the optical axis 10X, via the projector lens 32 in a direction substantially orthogonal to the optical axis 10X. Accordingly, the auto-collimation light rays which are emitted from the light source 31 are projected toward the corner cube 18 to travel on a light path which is offset from the optical axis 10X, i.e., not to travel on the optical axis 10X. The auto-collimation light rays which are projected toward the corner cube 18 are reflected thereby back to the telescope optical system 10 in a manner similar to that of the distance measurement light rays which are projected toward the corner cube 18. After passing through the half mirror surface 13a, the auto-collimation light rays are reflected by a dichroic mirror surface 13b of the beam splitter 13 to be incident on a CCD 33. The dichroic mirror surface 13b has a property of totally reflecting the incident light having a wavelength of 780 nanometers. The surveying instrument 100 is provided with a coordinate detector 34, a horizontal-axis drive mechanism 35 and a vertical-axis drive mechanism 36, and the CCD 33 is electrically connected to the coordinate detector 34 so that the coordinate detector 34 outputs drive signals to the horizontal-axis drive mechanism 35 and the vertical-axis drive mechanism 36 to drive the horizontal-axis drive mechanism 35 and the vertical-axis drive mechanism 36 to rotate the surveying instrument body 1 about the horizontal axis 10H and the vertical axis 10V, respectively, so that the corner cube 18 is properly positioned on the optical axis 10X of the telescope optical system 10. These operations are performed according to a conventional auto-collimating function. The CCD 33, the coordinate detector 34, the horizontal-axis drive mechanism 35 and the vertical-axis drive mechanism 36 constitute an auto-collimating system.

The EDM function (distance measuring function) and the auto-collimating function which have been discussed above are known functions that conventional surveying instruments have. A feature of the present embodiment of the surveying instrument 100 is in that the distance measurement light rays which are emitted from the light source 21 are projected toward the corner cube 18 to travel on the optical axis 10X of the telescope optical system 10 via the first right-angle mirror 12X of the multi-functional composite mirror 12 while the auto-collimation light rays which are emitted from the light source 31 are projected toward the corner cube 18 to travel on a light path which is offset from the optical axis 10X of the telescope optical system 10 via the third right-angle mirror 12Z of the multi-functional composite mirror 12, wherein the light path does not intersect the optical axis 10X. In other words, the present embodiment of the surveying instrument 100 is characterized in that the optical axis 10X of the telescope optical system 10, on which the distance measurement light rays travel toward the corner cube 18, and an optical axis of a light path on which the auto-collimation light rays travel toward the corner cube 18 are offset from each other in the surveying instrument body 1. Therefore, neither the distance measurement light rays which are emitted from the light source 21 nor the auto-collimation light rays which are emitted from the light source 31 passes through any beam splitter or any half mirror which is used to combine two different light rays on the optical axis 10X. This does not reduce the amount of light of each of the two different light rays. In other words, loss in the amount of light of the two different light rays (the distance measurement light rays and the auto-collimation light rays) can be reduced by the arrangement wherein a light path of the auto-collimation light rays and a light path of the distance measurement light rays are offset from each other. This makes it possible to perform a distance measuring operation for a further distant survey point, or makes it possible to perform a distance measuring operation with a high degree of precision.

At this time, although the light rays which are passed through the objective lens 11 to proceed toward the beam splitter 13 are partly intercepted by the multi-functional composite mirror 12, as long as the auto-collimation light rays are focused on the reticle 16 (the CCD 33), a clear image can be viewed through the eyepiece 17.

Although the distance measurement light rays that are emitted from the light source 21 are projected to travel on the optical axis 10X of the telescope optical system 10 while the auto-collimation light rays that are emitted from the light source 31 are projected to travel on a light path offset from the optical axis 10X in the above illustrated embodiment of the surveying instrument, the auto-collimation light rays can be projected to travel on the optical axis 10X of the telescope optical system 10 while the distance measurement light rays can be projected to travel on a light path offset from the optical axis 10X.

Although the three reflecting surfaces 12a, 12b and 12c are formed on the three right-angle mirror bodies 12X, 12Y and 12Z, respectively, which constitute the multi-functional composite mirror 12 in the above illustrated embodiment of the surveying instrument, three reflecting surfaces respectively corresponding to the three reflecting surfaces 12a, 12b and 12c can be formed on a single member.

As can be understood from the foregoing, according to the present invention, a loss in the amount of light of each of the distance measurement light rays and the auto-collimation light rays can be reduced. In addition, a fine distance measuring operation and a fine auto-collimating operation can be performed even if a survey point is at a distant location.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A surveying instrument comprising:
   a surveying instrument body which is rotatable about each of a vertical axis and a horizontal axis, said surveying instrument body including a telescope optical system for collimating said surveying instrument relative to a survey point;
   a collimator optical system, provided in said surveying instrument body, for projecting first light rays toward said survey point through said telescope optical system and for receiving said first light rays reflected at said survey point;
   an auto-collimating system which rotates said surveying instrument body about each of said vertical axis and said horizontal axis to position said survey point on an optical axis of said telescope optical system in accordance with information on a location of said survey point;
   a distance measuring optical system, provided in said surveying instrument body, for projecting second light rays toward said survey point through said telescope optical system and for receiving said second light rays reflected at said survey point; and
   a distance measuring device for calculating a distance from said surveying instrument to said survey point in accordance with information on said second light rays which are projected toward said survey point by said distance measuring optical system and reflected at said survey point,
   wherein an optical axis of said collimator optical system on which said first light rays travel toward said survey point and an optical axis of said distance measuring optical system on which said second light rays travel toward said survey point are offset from each other in said telescope optical system.

2. The surveying instrument according to claim 1, wherein one of said optical axis of said collimator optical system and said optical axis of said distance measuring optical system is coincident with said optical axis of said telescope optical system.

3. The surveying instrument according to claim 1, wherein said optical axis of said distance measuring optical system is coincident with said optical axis of said telescope optical system.

4. The surveying instrument according to claim 3, wherein said collimator optical system comprises:
   a first light source which emits said first light rays; and
   an off-axis mirror which is provided at a position offset from said optical axis of said telescope optical system,
   wherein said distance measuring optical system comprises:
   a second light source which emits said second light rays; and
   an on-axis mirror which is positioned on said optical axis of said telescope optical system,
   wherein said off-axis mirror is angled at approximately 90 degrees with respect to said on-axis mirror, and
   wherein said on-axis mirror is angled at approximately 45 degrees with respect to said optical axis of said telescope optical system.

5. The surveying instrument according to claim 4, wherein said distance measuring optical system further comprises:
   a light receiving element; and
   a second on-axis mirror which is positioned behind said on-axis mirror to be substantially parallel to said on-axis mirror so that said second light rays which are reflected at said survey point back to said telescope optical system are reflected by said second on-axis mirror to be incident on said light receiving element.

6. The surveying instrument according to claim 5, wherein said telescope optical system comprises a half mirror positioned behind said second on-axis mirror on said optical axis of said telescope optical system in association with said second on-axis mirror.

7. The surveying instrument according to claim 5, wherein said off-axis mirror, said on-axis mirror and said second on-axis mirror are formed as a single member positioned behind an objective lens of said telescope optical system.

8. The surveying instrument according to claim 5, wherein said single member is positioned in front of a beam splitter of said telescope optical system.

9. A surveying instrument comprising:
   a surveying instrument body rotatable about each of a vertical axis and a horizontal axis;
   a telescope optical system, provided in said surveying instrument body, for collimating said surveying instrument relative to a survey point;
   a collimator optical system, provided in said surveying instrument body, for projecting first light rays toward said survey point through said telescope optical system and for receiving said first light rays reflected at said survey point; and
   a distance measuring optical system, provided in said surveying instrument body, for projecting second light rays toward said survey point through said telescope optical system and for receiving said second light rays reflected at said survey point,
   wherein an optical path of said first light rays projected toward said survey point through said telescope optical system and an optical path of said second light rays projected toward said survey point through said telescope optical system are offset from each other in said telescope optical system.

* * * * *